(12) United States Patent
Wu et al.

(10) Patent No.: US 10,823,211 B2
(45) Date of Patent: Nov. 3, 2020

(54) FLOATING FASTENER

(71) Applicant: HANWIT PRECISION INDUSTRIES LTD., New Taipei (TW)

(72) Inventors: Ming-De Wu, New Taipei (TW); Chih-Yuan Chen, New Taipei (TW)

(73) Assignee: Hanwit Precision Industries Ltd., New Taipei (TW)

( * ) Notice: Subject to any disclaimer, the term of this patent is extended or adjusted under 35 U.S.C. 154(b) by 249 days.

(21) Appl. No.: 16/124,745

(22) Filed: Sep. 7, 2018

(65) Prior Publication Data

US 2019/0003501 A1    Jan. 3, 2019

Related U.S. Application Data

(63) Continuation-in-part of application No. 15/861,174, filed on Jan. 3, 2018.

(30) Foreign Application Priority Data

Feb. 10, 2017   (TW) .............................. 106202006 U

(51) Int. Cl.
*F16B 5/02* (2006.01)
*F16B 37/04* (2006.01)
*F16B 39/284* (2006.01)
*F16B 33/00* (2006.01)

(52) U.S. Cl.
CPC .......... *F16B 5/0208* (2013.01); *F16B 5/0266* (2013.01); *F16B 37/044* (2013.01); *F16B 39/284* (2013.01); *F16B 5/02* (2013.01); *F16B 33/004* (2013.01); *F16B 33/008* (2013.01)

(58) Field of Classification Search
CPC .... F16B 5/0208; F16B 5/0266; F16B 33/004; F16B 33/008; F16B 37/044; F16B 37/14; F16B 39/284; F16B 41/005; F16B 5/02; Y10S 411/91
USPC .................................. 411/372.5, 372.6, 373
See application file for complete search history.

(56) References Cited

U.S. PATENT DOCUMENTS

| | | | | |
|---|---|---|---|---|
| 2,857,597 | A * | 10/1958 | Morgan, Jr. ............. | A42B 3/14 2/414 |
| 5,653,564 | A * | 8/1997 | Nakamura .............. | F16B 37/14 411/373 |
| 6,012,889 | A * | 1/2000 | Robbins .................. | F16B 37/14 411/372.6 |
| 6,264,413 | B1 * | 7/2001 | Bisping ................... | F16B 13/04 411/15 |
| 6,381,806 | B1 * | 5/2002 | Stanesic ................. | B60N 3/046 16/4 |
| 7,931,430 | B2 * | 4/2011 | Thrift .................... | F16B 39/103 411/121 |

(Continued)

*Primary Examiner* — Roberta S Delisle
(74) *Attorney, Agent, or Firm* — Muncy, Geissler, Olds & Lowe, P.C.

(57) ABSTRACT

A floating fastener includes a socket fastened to a first board member, a locking device axially slidably mounted in the socket and adapted for locking the socket and the first board member to a second board member, and an insulative barrel including a flexible barrel body attached onto the socket, a cap for capping on the barrel body to shield the locking device in the socket and to protect the socket and the locking device against corrosion and a flexible connecting strip connected between the barrel body and the cap.

10 Claims, 7 Drawing Sheets

(56) References Cited

U.S. PATENT DOCUMENTS

| | | | |
|---|---|---|---|
| 8,388,288 B2* | 3/2013 | Chiu | B29C 45/14336 411/107 |
| 2005/0100425 A1* | 5/2005 | Wu | F16B 37/14 411/372.5 |
| 2009/0313804 A1* | 12/2009 | Wang | F16B 5/0208 29/525.11 |
| 2011/0070049 A1* | 3/2011 | Wang | F16B 5/0208 411/372.6 |

* cited by examiner

FLOATING FASTENER

This application is a Continuation-In-Part of application Ser. No. 15/861,174, filed on Jan. 3, 2018, for which priority is claimed under 35 U.S.C. § 120, the entire contents of which are hereby incorporated by reference.

BACKGROUND OF THE INVENTION

1. Field of the Invention

The present invention relates to fasteners for detachably fastening board members in a stack and more particularly, to a floating fastener, which uses an insulative barrel to protect a socket and a locking device against water and corrosion, providing excellent insulative effect and prolonging the overall lifespan.

2. Description of the Related Art

When joining board members, floating fasteners consisting of a socket, a metal lock screw, a spring and a rotary knob may be used. However, the air in a high-humidity living environment often contains a large amount of moisture and salt, etc., and the moisture or salt will directly contact the metal lock screw. After a long use, the metal lock screw will be damp, corroded, oxidized, rusted or aged and pulverized due to the effect of moisture and salt, affecting the locking function and shortening the overall service life. Conventional lock screws are not treated with waterproof and anti-corrosion treatments after they are manufactured. If a lock screw is rusted after fastened to board members, it becomes not detachable from the board members in a maintenance work.

Therefore, it is desirable to provide a floating fastener that eliminates the aforesaid problems.

SUMMARY OF THE INVENTION

The present invention has been accomplished under the circumstances in view. According to a first aspect of the present invention, the floating fastener is fastened to a first board member and adapted to detachably locking the first board member to a second board member, comprising a socket, a locking device, and an insulative barrel. The socket is fastened to the first board member, defining therein a socket hole. The locking device is loaded with a spring and axially slidably mounted in the socket and adapted for locking the socket and the first board member to the second board member, comprising a head disposed above the socket, a shank downwardly extended from the head and axially slidably inserted through the socket hole, and a fastening tip axially extended from a bottom side of the shank opposite to the head and axially movable with the shank into or out of a bottom side of the socket hole of the socket. The insulative barrel is made from an elastic insulative material for protecting the socket and the locking device, comprising a barrel body, a barrel hole defined in the barrel body for receiving the socket, a bottom stop portion for stopping against a top wall of the first board member, a cap for capping on the barrel body, and a flexible connecting strip connected between the barrel body and the cap. The socket and the locking device are shielded by the insulative barrel so that the insulative barrel provides excellent insulative and waterproof effects to protect the socket and the locking device against corrosion and to prolong the lifespan of the floating fastener.

According to a second aspect of the present invention, the cap of the insulative barrel is openably capped on the barrel body. When wishing to unlock the locking device, the user simply needs to open the cap and does not need to remove the insulative barrel from the socket, facilitating application.

According to a third aspect of the present invention, the barrel body and cap of the insulative barrel are linked by the flexible connecting strip. When the cap is opened, it is still linked to the barrel body by the flexible connecting strip without missing.

According to a fourth aspect of the present invention, the diameter of the bottom opening of the barrel hole is larger than that of the top opening and the barrel hole is a tapered hole with the diameter thereof gradually increasing in direction from the top opening toward the bottom opening, facilitating capping of the barrel hole of the barrel body onto the socket.

According to a fifth aspect of the present invention, the diameter of the top opening of the barrel hole is smaller than the outer diameter of the top side of the socket so that when the barrel hole of the barrel body is attached onto the socket, the socket and the barrel body of the insulative barrel are firmly secured together without the use of any positioning structure therebetween, facilitating quick installation and minimizing design and mold costs.

According to a sixth aspect of the present invention, the abutment flange of the bottom stop portion of the barrel body is abutted against the top wall of the first board member to eliminate the presence of a gap between the bottom stop portion and the top wall of the first board member, achieving good waterproof effect.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
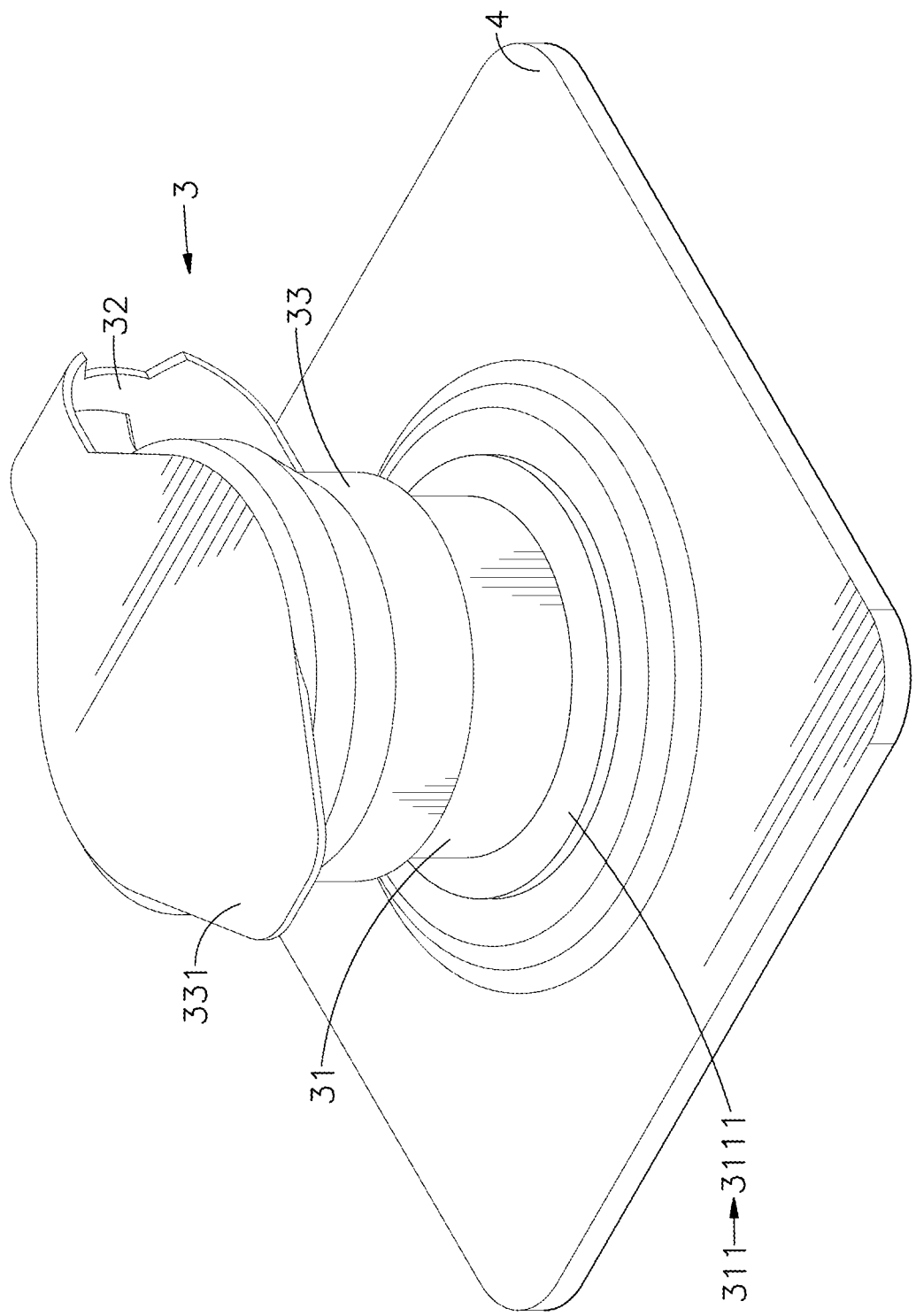
FIG. 1 is an oblique top elevational view of a floating fastener in accordance with the present invention.
Figure 2:
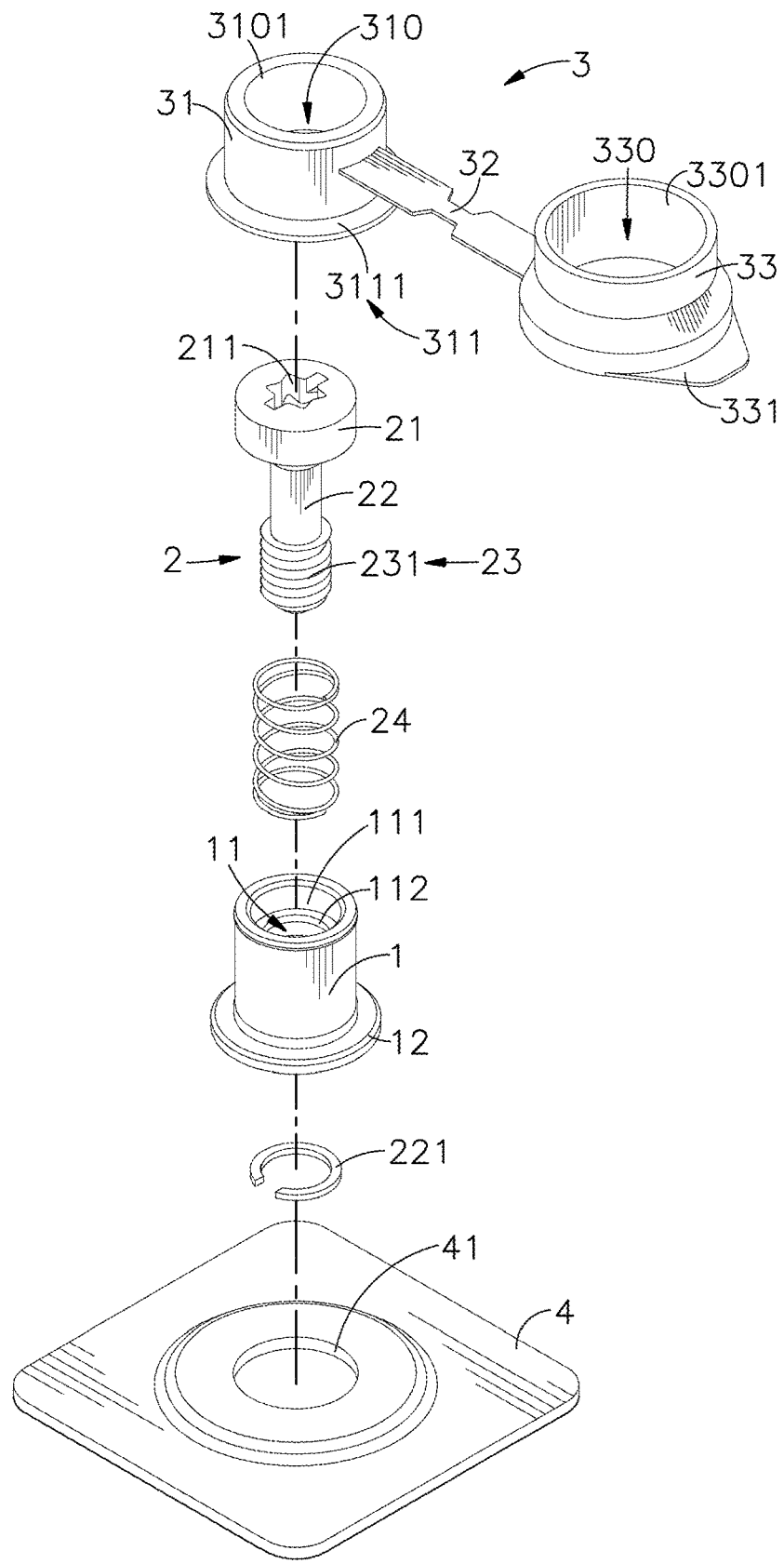
FIG. 2 is an exploded view of the floating fastener in accordance with the present invention.
Figure 3:
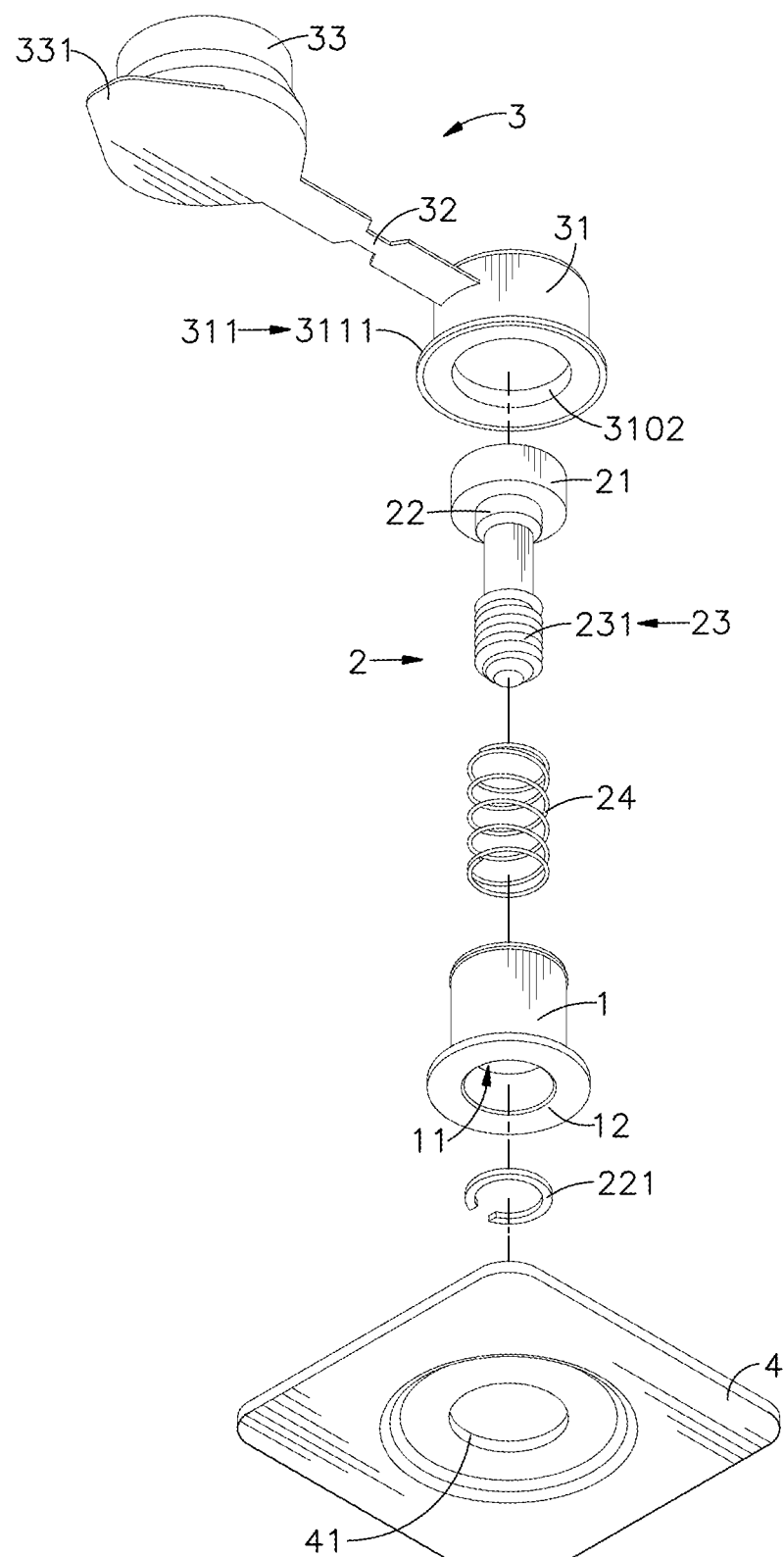
FIG. 3 corresponds to FIG. 2 when viewed from another angle.
Figure 4:
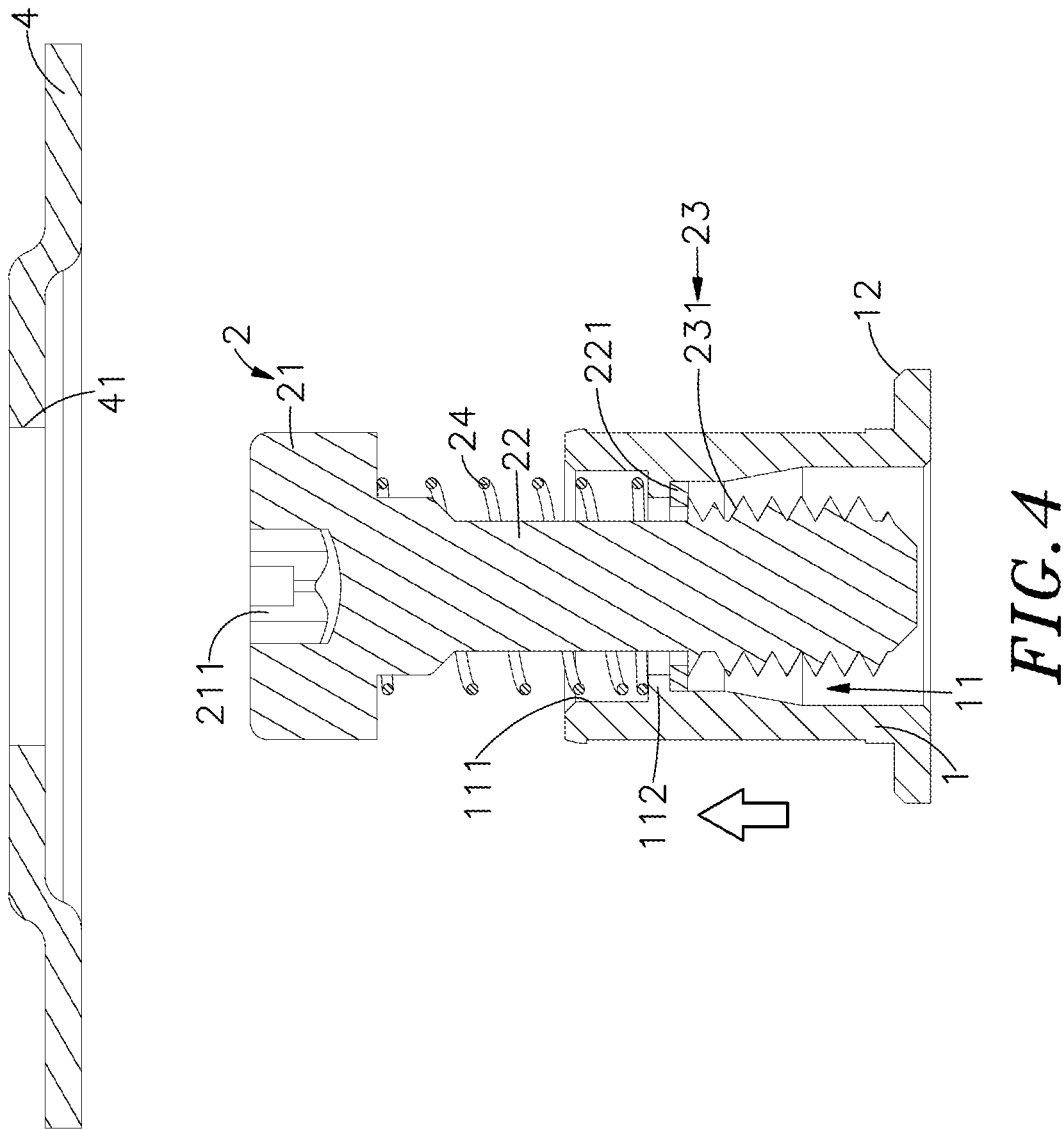
FIG. 4 is a sectional side view of the floating fastener in accordance with the present invention.
Figure 5:
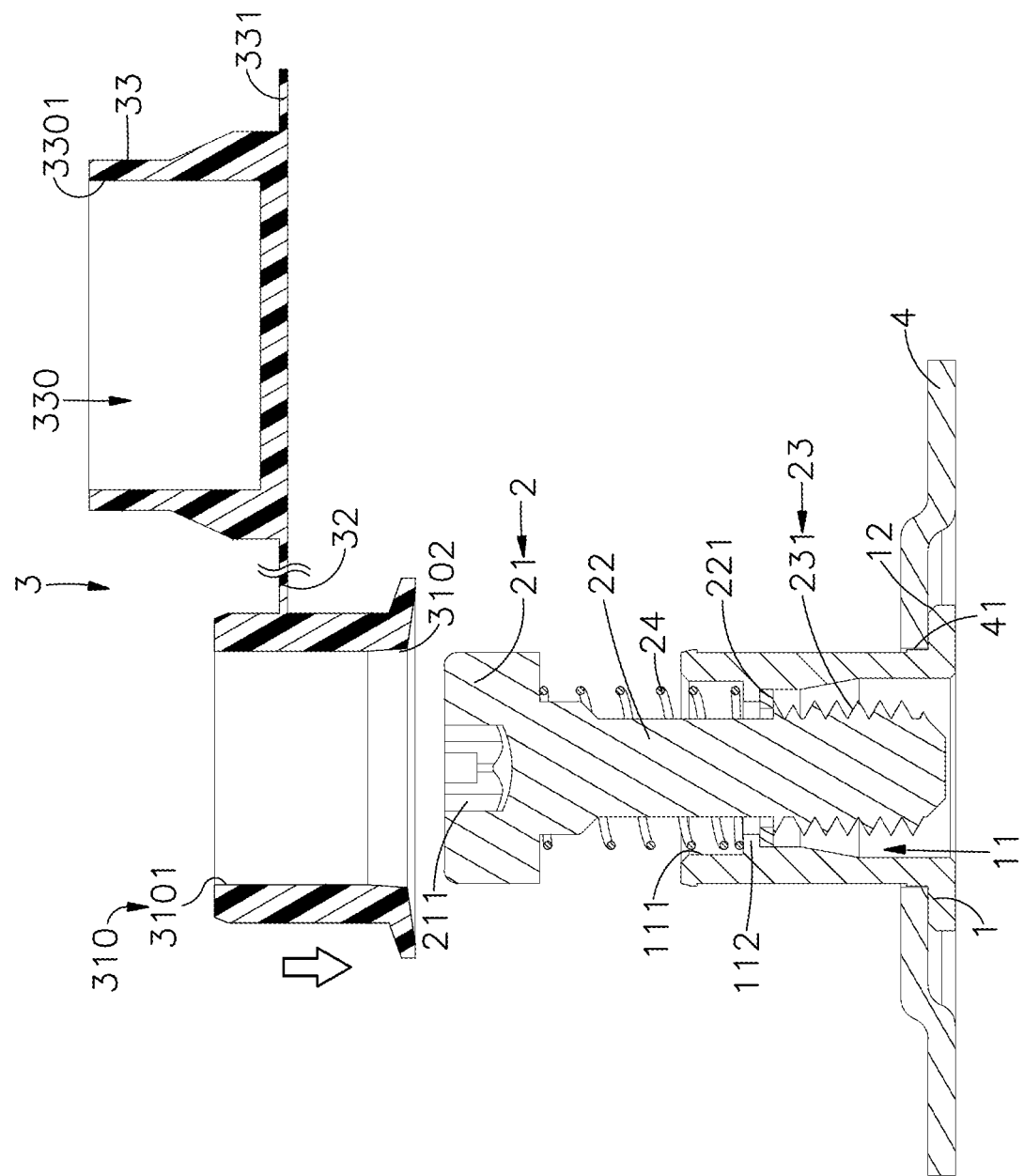
FIG. 5 is a sectional side view of the present invention before mounting of the insulative barrel.
Figure 6:
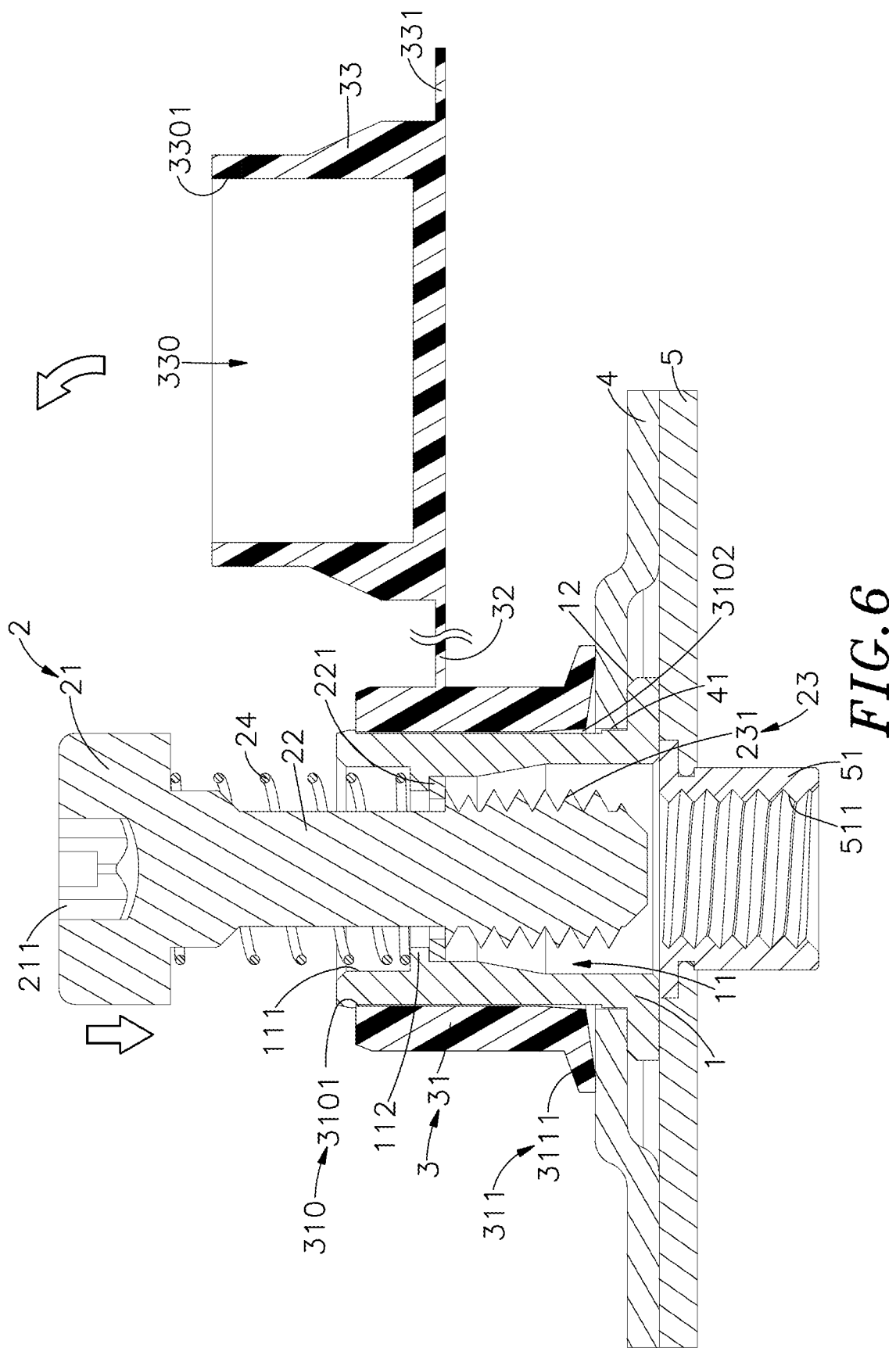
FIG. 6 is a schematic sectional applied view of the present invention, illustrating the floating fastened installed in a first board member before locking to a second board member.
Figure 7:
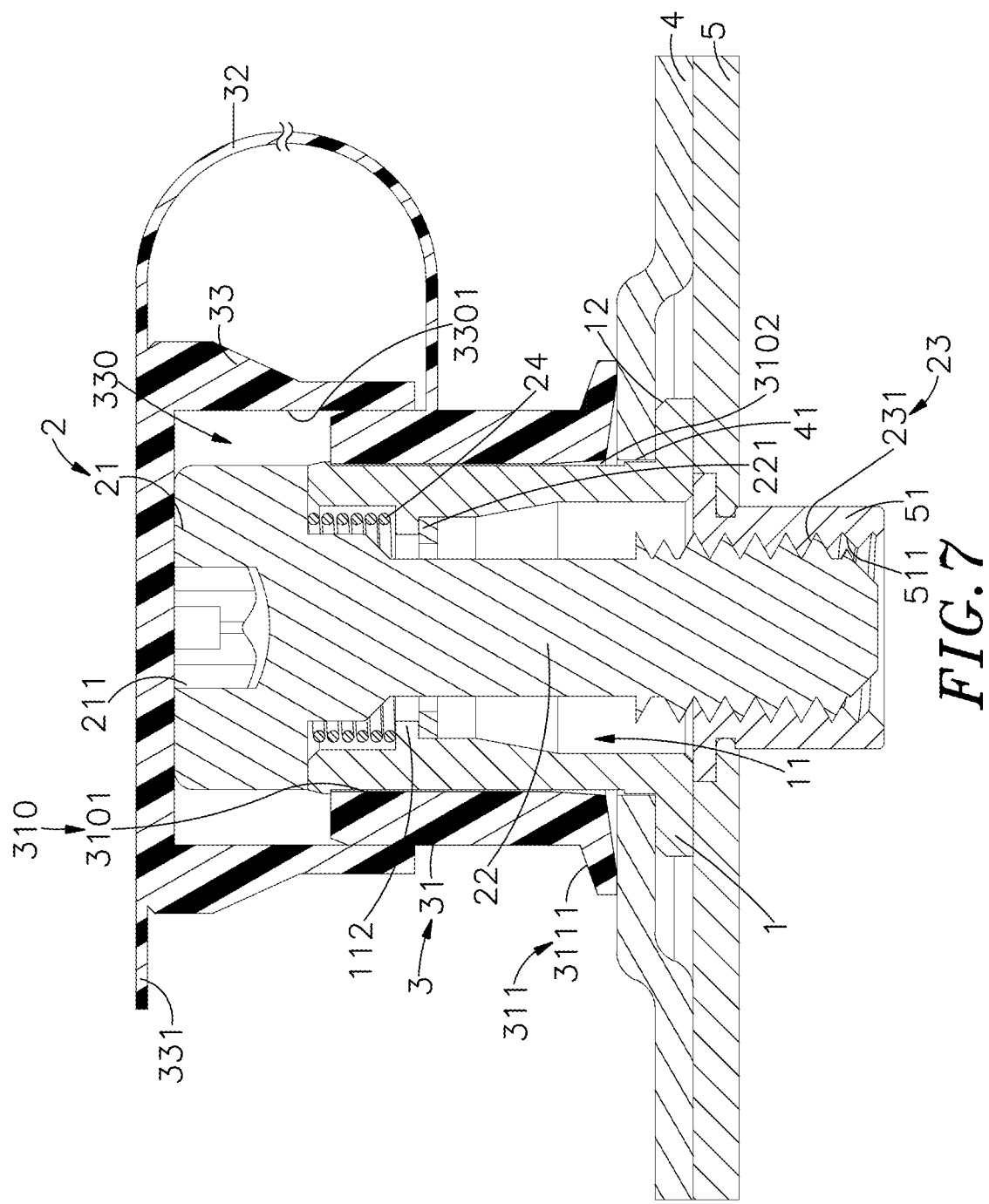
FIG. 7 corresponds to FIG. 6, illustrating the locking device fastened to the second board member and the cap capped on the barrel body.

Referring to FIGS. 1-7, a floating fastener in accordance with the present invention is shown. The floating fastener comprises a socket 1, a locking device 2, a C-shaped retainer ring 221, an elastic member 24, and an insulating barrel 3.

The socket 1 is made of metal, comprising an accommodation open chamber 111 defined in a top side thereof, a socket hole 11 axially downwardly extended from the accommodation open chamber 111 and cut through an opposing bottom side thereof, an internal annular flange 112 extended around an inside wall thereof between the accommodation open chamber 111 and the socket hole 11 and a bottom mounting portion 12 extended around the periphery of the bottom side thereof.

The locking device 2 in the present preferred embodiment is a lock screw, comprising a head 21 made in, for example, a circular shape and disposed above the socket 1, a driving tool receiving portion 211 located on a top side of the head 21 in the form of, for example, a Phillips groove, hex groove, six-point star pattern groove or hex stem, or any other design for receiving a screwdriver or the like that is operable to rotate the locking device 2, a shank 22 axially downwardly extended from an opposing bottom wall of the head 21 and insertable through the accommodation open chamber 111 and socket hole 11 of the socket 1 and terminating in a fastening tip 23 that has an outer thread 231 spirally extended around the periphery thereof.

The C-shaped retainer ring 221 is mounted around the shank 22 and abutted to a bottom side of the internal annular flange 112 of the socket 1 and stoppable above the fastening tip 23 to prohibit the locking device 2 from falling out of the socket 1.

The elastic member 24 is mounted around the shank 22 and stopped between the head 21 of the locking device 2 and the internal annular flange 112 of the socket 1.

The insulating barrel 3 is made from a flexible insulative plastic material, rubber or silicon rubber, comprising a barrel body 31, a barrel hole 310 defined in the barrel body 31 for receiving the socket 1, a relatively smaller top opening 3101 defined in a top side of the barrel body 31 and disposed in communication with a top side of the barrel hole 310, a relatively larger bottom opening 3102 defined in an opposing bottom side of the barrel body 31 and disposed in communication with an opposing bottom side of the barrel hole 310, a bottom stop portion 311 that is an abutment flange 3111 extended around the periphery of the bottom side of the barrel body 31, a cap 33 for capping on the barrel body 31, and a flexible connecting strip 32 connected between the barrel body 31 and the cap 33. The cap 33 comprises a cap hole 330 having a cap opening 3301 and configured to receiving the barrel body 31, and a finger grip 331 extended from the periphery thereof.

Further, the barrel hole 310 is a tapered hole with the diameter thereof gradually increasing in direction from the top opening 3101 toward the bottom opening 3102, facilitating capping of the barrel hole 310 of the barrel body 31 onto the socket 1.

Further, the diameter of the top opening 3101 of the of the barrel body 31 is preferably smaller than the outer diameter of the top side of the socket 1 so that the barrel body 31 can be press-fitted onto the socket 1. In actual application, the diameter barrel hole 310 of the top opening 3101 of the of the barrel body 31 can be made equal to or slightly larger than the outer diameter of the top side of the socket 1, allowing the barrel body 31 to be attached onto the socket 1 without causing displacement.

However, the diameter of the cap opening 3301 of the cap hole 330 of the cap 33 is preferably smaller than the outer diameter of the top side of the barrel body 31 of the insulative barrel 3 so that the cap 33 can be press-fitted onto the barrel body 31. However, in actual application, the diameter of the cap opening 3301 of the cap hole 330 of the cap 33 can be made equal to or slightly larger than the outer diameter of the top side of the barrel body 31, allowing capping of the cap 33 onto the barrel body 31 without causing displacement.

In installation, mount the elastic member 24 on the shank 22 of the locking device 2, then insert the locking device 2 downwardly into the socket hole 11 of the socket 1. At this time, the periphery of the bottom side of the head 21 of the locking device 2 is abutted against the top edge of the socket 1, one end of the elastic member 24 is elastically stopped at the inside of the accommodation open chamber 111 of the socket hole 11 and the other end of the elastic member 24 is elastically stopped against the bottom side of the head 21, and thus, the elastic member 24 is elastically movably held between the accommodation open chamber 111 of the socket hole 11 and the head 21 of the locking device 2. Thereafter, attach the barrel body 31 of the insulative barrel 3 onto the outside of the socket 1, allowing the head 21 of the locking device 2 to pass through the bottom opening 3102 and the top opening 3101 of barrel hole 310 to the outside of the barrel body 31. After installation, the socket 1 is positively received in barrel hole 310 of the barrel body 31.

The floating fastener of the present invention can be applied to a telecommunication cabinet, a computer server, a working machine table or other equipment board set, a drawer, a keyboard rack and the like, which are composed of a plurality of board members. In application, upwardly insert the socket 1 through a mounting through hole 41 of a first board member 4 to stop the bottom mounting portion 12 of the socket 1 at a bottom wall of the first board member 4 around the mounting through hole 41, then attach the barrel body 31 of the insulative barrel 3 onto the socket 1 to abut the abutment flange 3111 of the bottom stop portion 311 of the barrel body 31 against an opposing top wall of the first board member 4, eliminating the presence of a gap between the bottom stop portion 311 and the top wall of the first board member 4. At this point, force the locking device 2 downward to extend the fastening tip 23 out of the socket 1 and the mounting through hole 41, then rotate the locking device 2 with the hand, or a hand tool (for example, screwdriver) or power tool (for example, power screwdriver) to drive the outer thread 231 of the fastening tip 23 into a mounting screw hole 511 of a locating member 51 at a second board member 5 to lock the first board member 4 to the second board member 5. When a hand tool or power tool is used, it is attached to the driving tool receiving portion 211 of the head 21 and operated to rotate the locking device 2, driving the outer thread 231 of the fastening tip 23 into the mounting screw hole 511 of the locating member 51 of the second board member 5.

After locking, the cap 33 of the insulative barrel 3 is reversed to elastically deform the flexible connecting strip 32, and then cap the cap 33 on the barrel body 31 to let the head 21 of the locking device 2 be received in the cap hole 330 of the cap 33. Thus, the insulative barrel 3 shields the socket 1 and the locking device 2 to keep the socket 1 and the locking device 2 from sight, providing the floating fastener with an electrically insulative effect for protection against corrosion in a salty environment to prolong the overall lifespan.

When going to unlock the locking device 2, operate the finger grip 331 of the cap 33 to open the cap 33 from the barrel body 31 and to expose the head 21 of the locking device 2 to the outside of the socket 1, and then use the hand or a hand tool or power tool to rotate the locking device 2 in the reversed direction, disengaging the fastening tip 23 of the locking device 2 from the mounting screw hole 51 of the second board member 5.

In the present preferred embodiment, the socket 1 is mounted to the first board member 4 by upwardly inserting the socket 1 through the mounting through hole 41 of the first board member 4 to force the bottom mounting portion 12 of the socket 1 into abutment against the bottom wall of the first board member 4 around the mounting through hole 41. Alternatively, the socket 1 can be fastened to the first board member 4 by riveting or welding, or by means of a screw joint. For example, the socket 1 can be configured to provided an inner thread or outer thread (not shown) at the bottom mounting portion 12 for fastening to an outer thread or inner thread (not shown) at the first board member 4.

In summary, the invention has the advantages and features as follows:

1. The socket 1 and the locking device 2 are shielded by the insulative barrel 3 so that the insulative barrel 3 provides excellent insulative and waterproof effects to protect the socket 1 and the locking device 2 against corrosion and to prolong the lifespan of the floating fastener.

2. The cap 33 of the insulative barrel 3 is openably capped on the barrel body 31. When wishing to unlock the locking device 2, the user simply needs to open the cap 33 and does not need to remove the insulative barrel 3 from the socket 1, facilitating application.

3. The barrel body 31 and cap 33 of the insulative barrel 3 are linked by the flexible connecting strip 32. When the cap 33 is opened, it is still linked to the barrel body 31 by the flexible connecting strip 32 without missing.

4. The diameter of the bottom opening 3102 of the barrel hole 310 is larger than that of the top opening 3101 and the barrel hole 310 is a tapered hole with the diameter thereof gradually increasing in direction from the top opening 3101 toward the bottom opening 3102, facilitating capping of the barrel hole 310 of the barrel body 31 onto the socket 1.

5. The diameter of the top opening 3101 of the barrel hole 310 is smaller than the outer diameter of the top side of the socket 1 so that when the barrel hole 310 of the barrel body 31 is attached onto the socket 1, the socket 1 and the barrel body 31 of the insulative barrel 3 are firmly secured together without the use of any positioning structure therebetween, facilitating quick installation and minimizing design and mold costs.

6. The abutment flange 3111 of the bottom stop portion 311 of the barrel body 31 is abutted against the top wall of the first board member 4 to eliminate the presence of a gap between the bottom stop portion 311 and the top wall of the first board member 4, achieving good waterproof and dustproof effects.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A floating fastener comprising:
a socket comprising a socket hole;
a locking device comprising a head disposed above said socket, a shank downwardly extended from said head and axially slidably inserted through said socket hole and a fastening tip axially extended from a bottom side of said shank opposite to said head and axially movable with said shank into or out of a bottom side of said socket hole of said socket; and
an insulative barrel made from an elastic insulative material, said insulative barrel comprising a barrel body, a barrel hole defined in said barrel body for receiving said socket, a bottom stop portion for stopping against a top wall of a first board member, a cap for capping on said barrel body, and a flexible connecting strip connected between said barrel body and said cap.

2. The floating fastener as claimed in claim 1, further comprising an elastic member mounted around said shank of said locking device and stopped between an accommodation open chamber and said head, wherein said socket further defines said accommodation open chamber in a top side of said socket hole for accommodating said elastic member.

3. The floating fastener as claimed in claim 1, wherein said socket further comprises a bottom mounting portion extended around the periphery of a bottom side of said socket hole.

4. The floating fastener as claimed in claim 1, wherein said locking device comprises a driving tool receiving portion located at a top wall of said head and selectively made in the form of Phillips groove, hex groove, six-point star pattern groove or hex stem.

5. The floating fastener as claimed in claim 1, wherein said insulating barrel is made from an insulative plastics, rubber and silicon rubber.

6. The floating fastener as claimed in claim 1, wherein said barrel body of said insulative barrel comprises a relatively smaller top opening defined in a top side thereof and disposed in communication with a top side of said barrel hole and a relatively larger bottom opening defined in an opposing bottom side thereof and disposed in communication with an opposing bottom side of said barrel hole, the diameter of said bottom opening is larger than said top opening; said barrel hole is a tapered hole with the diameter thereof gradually increasing in direction from said top opening toward said bottom opening.

7. The floating fastener as claimed in claim 1, wherein the diameter of a top opening of said barrel body is smaller than the outer diameter of a top side of said socket.

8. The floating fastener as claimed in claim 1, wherein said bottoms stop portion of said barrel body is an abutment flange extended around the periphery of the bottom side of said barrel body.

9. The floating fastener as claimed in claim 1, wherein a cap hole defines a cap opening, the diameter of said cap opening being smaller than the outer diameter of the top side of said barrel body of said insulative barrel.

10. The floating fastener as claimed in claim 1, wherein said cap of said insulative barrel comprises a finger grip extended from the periphery thereof.

* * * * *